United States Patent
Molloy

Patent Number: 6,078,349
Date of Patent: Jun. 20, 2000

[54] PROCESS AND SYSTEM FOR INCREASING THE DISPLAY RESOLUTION OF A POINT-TO-POINT VIDEO TRANSMISSION RELATIVE TO THE ACTUAL AMOUNT OF VIDEO DATA SENT

[75] Inventor: Mark Edward Molloy, San Jose, Calif.

[73] Assignee: Compaq Computer Corporation, Houston, Tex.

[21] Appl. No.: 08/883,936

[22] Filed: Jun. 27, 1997

Related U.S. Application Data

[63] Continuation of application No. 08/473,760, Jun. 7, 1995, abandoned.

[51] Int. Cl.[7] .............................. H04N 7/14; H04N 7/12; H04N 11/02; H04N 5/225

[52] U.S. Cl. .............................. 348/15; 348/17; 348/384; 386/117

[58] Field of Search .............................. 348/15, 17, 581, 348/384, 408; 364/514; 358/426; 382/56; 386/1, 46, 117

[56] References Cited

U.S. PATENT DOCUMENTS

| | | | |
|---|---|---|---|
| 4,494,144 | 1/1985 | Brown | 358/133 |
| 4,797,750 | 1/1989 | Karweit | 358/335 |
| 5,282,255 | 1/1994 | Bovik et al. | 382/56 |
| 5,389,965 | 2/1995 | Kuzma | 348/14 |
| 5,392,223 | 2/1995 | Caci | 364/514 |
| 5,432,871 | 7/1995 | Novik | 382/232 |
| 5,438,357 | 8/1995 | McNelley | 348/15 |
| 5,543,939 | 8/1996 | Harvey et al. | 358/426 |

*Primary Examiner*—Douglas W. Olms
*Assistant Examiner*—David R Vincent
*Attorney, Agent, or Firm*—Fenwick & West LLP

[57] ABSTRACT

A process and system for improving the display resolution of a video image that is transmitted point-to-point. The process and system function by determining regions on a screen that are of high interest to a viewer and regions on the screen which are of lower interest to the viewer. Regions of high interest to the viewer are transmitted from a video source and displayed on the screen at a higher resolution than those regions of lower interest to the viewer.

13 Claims, 4 Drawing Sheets

PROCESS AND SYSTEM FOR INCREASING THE DISPLAY RESOLUTION OF A POINT-TO-POINT VIDEO TRANSMISSION RELATIVE TO THE ACTUAL AMOUNT OF VIDEO DATA SENT

This application is a continuation, of application Ser. No. 08/473,760 filed Jun. 7, 1995, now abandoned.

BACKGROUND OF THE INVENTION

1. Field of the Invention

The present invention relates to processes of and systems for displaying point-to-point video transmissions. More particularly, but without limitation, the present invention relates to processes and systems for enhancing the display resolution of a display device for a given transmission bandwidth without changing the total amount of data sent.

2. Description of Related Art

A limiting factor in the use of high resolution video display devices for point-to-point video transmission is the large bandwidth required to transmit an acceptably high resolution video image. An example of point-to-point video transmission is the video transmission that occurs between two video telephones in a video telephone conversation. In a video telephone conversation the image of each speaker is transmitted from one telephone to the other telephone.

Generally, when more image clarity and color resolution is desired in the image transmitted in point-to-point video transmission, more information has to be transmitted, and the requirement for the bandwidth in the transmission medium is greater. A requirement for fast image updates, as in the case of a changing image, further increases the amount of information that must be transmitted per unit of time. This requirement, in turn, increases the necessary bandwidth required of the transmission medium. Therefore, if a video display device having extremely high resolution display capability is employed to display point-to-point video transmission, then a transmission medium having the required bandwidth must be used in order for the high resolution display to be used to its full potential. An example of a high resolution display device is a large screen television with a display made of 10,000 miniature cathode ray tubes. Attempting to support such a display device would only make the effect of bandwidth limitations on point-to-point video transmissions more severe.

Therefore, there is a need for providing high resolution images by an efficient use of the available bandwidth of a transmission medium.

SUMMARY OF THE INVENTION

This invention provides a process and system for increasing the display resolution of a sensory image, such as a video image.

From a process standpoint, a preferred embodiment of the invention comprises the following steps. A viewer selects a subset of all pixels on a screen of a sensory image display device. The image is transmitted to the screen in more detail for the selected subset of pixels, but in less detail for the remainder of pixels. The discussion in the detailed description below is primarily in terms of video images, however, the term sensory image reflects the fact that this invention is applicable to other types of images as well.

Assuming that only a fixed amount of total data per unit time can be transmitted to the screen, by limiting the amount of detail transmitted for some areas of the display, more data can be transmitted for others. In particular, this approach enhances the resolution of the screen with respect to the subset of pixels selected by the viewer.

From a system standpoint, a preferred embodiment of the invention comprises a sensory display device having a screen. It further comprises means for determining region coordinates on the screen of at least a high resolution region and of a low resolution region. This systems further includes a means for transmitting at least the region coordinates for the high resolution region. In addition, there is a means for receiving the region coordinates. Further there is a sensory image recorder, having an output, for making a sensory source image available at its output. There also is an image digitizer coupled to the output of the sensory image recorder for digitizing the sensory source image. Then there is a means for region-differentially compressing the digitized sensory source image in accordance with the region coordinates. Basically, this part of the system involves packaging data representative of the image in such a way that less data is used to represent some regions on the screen than others. Furthermore, the system includes means for transmitting the region-differentially compressed sensory source image. The system also includes means for receiving the region-differentially compressed sensory source image. Finally, the system has a means for providing a region-differentially decompressed and assembled sensory source image for display on the screen. In this last part, the system basically recreates on a screen the transmitted image. Since some regions of the transmitted image are represented with less data than others, those with less data will have less resolution than the other regions.

BRIEF DESCRIPTION OF THE DRAWINGS

The invention will now be described with reference to the accompanying drawings, wherein.

DETAILED DESCRIPTION OF THE PREFERRED EMBODIMENTS

The following description is of the best presently contemplated modes of carrying out the invention. This description is made for the purpose of illustrating the general principles of the invention and is not to be taken in a limiting sense.

Figure 1:
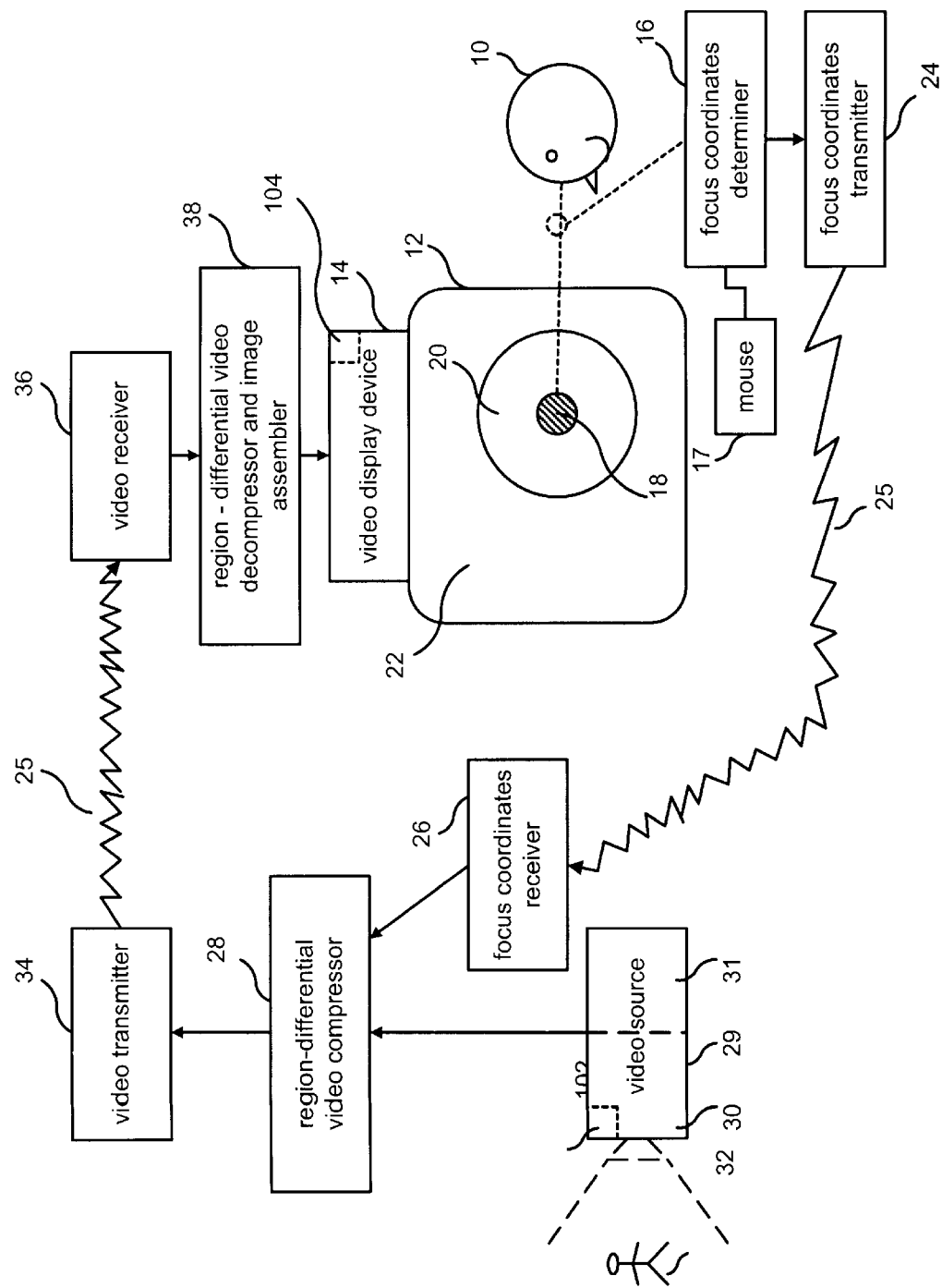
FIG. 1 is a block diagram of a system for improving the display resolution of a video image, which is transmitted point-to-point through a transmission medium with a finite transmission bandwidth, according to one preferred embodiment of the present invention.

FIG. 1 illustrates a preferred embodiment of the invention. The following is a discussion of some of the general concepts involved in this embodiment. The total amount of data that can be sent point-to-point may be limited by, for example, a bandwidth limitation of a transmission medium. For a given amount of data that can be transmitted point-to-point, generally, the system in FIG. 1, achieves a higher resolution of a selected region of an image.

Instead of transmitting the same amount of data per unit area of the image for all regions of the image, the system in FIG. 1 transmits more data for regions of higher interest to a viewer than for regions of lower interest to the viewer. Therefore, the total amount of data sent to describe the image does not have to be greater than that necessary for a standard system for which an equal amount of data is sent for all regions of the image. However, the resolution of the displayed image is greater for the system of FIG. 1, than it would be for a standard system, because the viewer is focusing on the regions of higher interest to him or her. Stated differently, the viewer largely does not notice the lower resolution of some regions of the image because he or she is not focusing attention on them.

The following paragraphs explain which regions would typically be of higher and of lower interest to a viewer. A person with normal vision who simply looks around himself or herself will be able to discern an immense amount of detail with very accurate color discrimination across a very large field of view. Since a person has the ability to move his or her eyes, head, and body, the potential field of vision becomes 360 degrees on both the vertical and the horizontal axes. Unless physically constrained, one is seldom aware of how constrained one's field of vision would be without this ability to move. However, at any given moment, a person is focused on a particular region of his or her potential field of vision, which limits what and with what clarity that person sees objects in his or her field of vision. To experience the importance of this focusing effect, a person might try, for example, to read a document without moving either his or her head or eyes. That person would notice that without bodily or eye movement, typically the region of the document that the person would see clearly would only be a relatively small portion of the document. That small portion is defined here as a focus region, and it is that region that is the region of highest interest to a viewer. The entire region that the person would be able to see without bodily movement is defined here as the actual field of vision.

The region within the actual field of vision but outside the focus region is a region of lower interest to a viewer, because the viewer cannot see it clearly at the time that his or her attention is directed to the focus region. Furthermore, the region outside a viewer's actual field of vision generally is of no interest to the viewer at the time the viewer is focused on a particular region.

To represent the potential field of vision at a high degree of resolution would require an enormous amount of data. However, to represent the actual field of vision (i.e., that which can be seen without bodily movement) at a high degree of resolution requires much less data. To represent only the focus region at a high degree of resolution requires even less data.

In the described embodiment, data representing visual information that could be displayed, but is outside the actual field of vision of a viewer, is not transmitted at all because the viewer cannot see it. Data representing the actual field of vision, but outside the focus region, is transmitted at a significantly reduced level of detail. Data representing the focus region is transmitted at a high resolution.

FIG. 1 shows a preferred embodiment of point-to-point video transmission. In FIG. 1, a viewer 10 ("a person viewing") is looking at a screen 12 of a video display device 14. A focus coordinates determiner 16 is viewer 10 controlled. Preferably, the screen 12 is divided into at least two regions: a high resolution region 18 and a low resolution region 20. In another embodiment, the screen 12 is subdivided into three regions: the high resolution region 18, the low resolution region 20, and, in addition, a no-resolution region 22.

The focus coordinates determiner 16 has an output, which is coupled to a focus coordinates transmitter 24, which communicates via a communications link 25 with a focus coordinates receiver 26. The communications link 25, for example, could be a computer network, a telephone network, a direct radio link, or another suitable means for communicating. A region-differential video compressor 28 has a first input coupled to the focus coordinates receiver 26 and a second input coupled to an output of a video source 29, preferably comprising a video camera 30 and an image digitizer 31. Video source 29 records and digitizes a source image 32. The image 32 is displayed in regionalized form on screen 12, as explained below.

The region-differential video compressor 28 has an output coupled to an input of a video transmitter 34. The video transmitter 34 is capable of communicating via the communications link 25 with a video receiver 36. This communications link 25 could be the same as the one between the focus coordinates transmitter 24 and the focus coordinates receiver 26. The video receiver 36 has an output, which is coupled to an input of a region-differential video decompressor and image assembler 38. The region-differential video decompressor and image assembler 38 has an output coupled to an input of the video display device 14.

Preferably, the video display device 14 is a part of a first computer workstation, which has a monitor, which serves as the screen 12. The viewer 10 controls the focus coordinates determiner 16 to determine the location of the focus region on the screen 12 on which the viewer 10 is focusing. The focus region is defined as the high resolution region 18 on the screen 12. The focus coordinates determiner 16 also determines the coordinates of the low resolution region 20, which is the region on the screen 12 within the viewer's 10 actual field of vision, but on which the viewer 10 is not focusing.

When the entire screen 12 is within the viewer's 10 actual field of vision, then, by default, the entire screen 12, minus the high resolution region 18, becomes the low resolution region 20. Preferably, the coordinates of the actual field of vision are inferred from the coordinates of the focus region. This obviates the need for transmitting them separately (using the focus coordinates transmitter 24, which is further discussed below).

If necessary, the focus coordinates determiner 16 determines the region outside the low resolution region 20. That region is the no-resolution region 22. The no-resolution region 22 is the region on the screen 12 that is outside the viewer's 10 actual field of vision. Of course, another embodiment could include more than three regions of resolution. For example, another embodiment can have a transitional region between the high and the low resolution regions 18 and 20. That transitional region has a resolution that changes from high (near the high resolution region) to low (near the low resolution region). A transitional region can be produced by having the size of virtual pixels 68 (which are explained below) grow from a relatively small size near the high resolution region 18 to a relatively large size near the low resolution region 20.

Preferably, the focus coordinates determiner 16 includes a computer mouse 17 (typically already present at a computer workstation), which is controlled by the viewer 10. As is well known in the art, a computer mouse can be used to mark regions on the computer screen 12.

In one embodiment, the viewer 10 uses the computer mouse to mark a point on the screen on which the viewer 10 is focusing (the focal point). To determine region coordinates of the viewer's 10 focus region, which is later converted into the high resolution region 18 (and to determine the region coordinates of the low resolution region 20, unless they are inferred later, as discussed above), the focus coordinates transmitter 24, preferably implemented by a processor in the first computer workstation, executes software stored in a first memory of the computer workstation.

The software executed by the first processor determines the focal point location based on data supplied by the computer mouse into region coordinates for the high resolution region 18. The processor computes the region coordinates for the high resolution region 18 to encompass a small region (the size of which is preferably set by the viewer 10 using a mouse, but could be preset by the manufacturer of the system) around the focal point to approximate the focal region of a typical viewer 10. The shape of the high resolution region 18 (and of any other regions) can be circular, as shown in FIG. 1, or square, or another suitable shape. For example, the shape of the high resolution region 18 may be oval if it is known that viewer 10 is looking at the screen 12 at an angle.

In some applications, it can be advantageous to determine the region coordinates of the no-resolution region 22, as well. If data describing the image outside the actual field of vision of the viewer 10 can be transmitted from the video transmitter 34 to the video receiver 36, as discussed further below, with a requirement for only relatively little additional bandwidth, it might be worth doing so. For example, it may be simpler and cheaper to transmit data describing the no-resolution region 22 than to have software and/or hardware for distinguishing between the low resolution and the no-resolution regions 20 and 22.

Next, the focus coordinates transmitter 24 transmits the region coordinates to the input of the focus coordinates receiver 26. The focus coordinates transmitter 24 preferably includes additional software stored in the first memory and executed by the first processor. Executing this software, the focus coordinates transmitter 24 transmits the region coordinates via a suitable communications link 25 to the focus coordinates receiver 26.

The focus coordinates receiver 26 supplies the region coordinates to an input of the region-differential video compressor 28. Preferably, the focus coordinates receiver 26 is implemented as a second processor executing software loaded into a second memory in a second computer workstation for receiving information sent via the communications link 25. The focus coordinates receiver 26 is typically, but not necessarily, located away from the video display device 14. In fact, in a typical point-to-point video transmission system, the focus coordinates receiver 26 is located quite far away, as might be the case when the application of this process or system is to a long distance video telephone call.

The region-differential video compressor 28 has a second input for coupling a signal from the video source 29. The video source 29 preferably combines the video camera 30 with the image digitizer 31 comprising commercially available hardware and software for digitizing the image 32 presented to the video source 29. The image 32 is displayed in a modified form (as discussed below) on the screen 12 of the video display device 14.

The video source 29 digitizes the image 32 into an in-memory representation of the captured image 32 (which would necessarily be changing in real time for a changing video source input 32). The region-differential video compressor 28 takes the digitized image 32 from the video source 29 and the region coordinates from the focus coordinates receiver 26 to prepare and send packages of data representing screen 12 region updates, as explained below.

Figure 2:
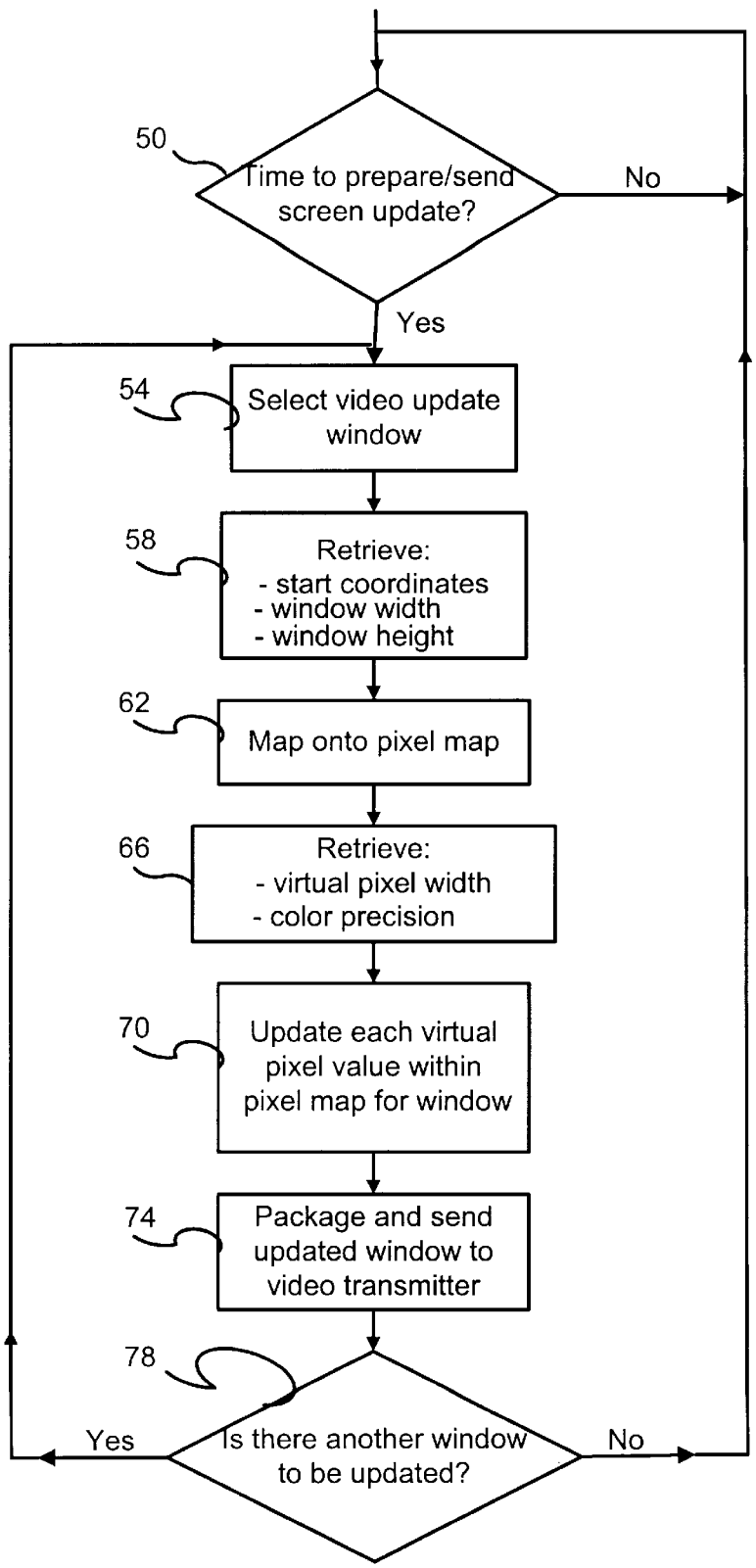
FIG. 2 is a flow chart of the steps performed by a processor implementing the function of a region-differential video compressor of FIG. 1.

The function of the region-differential video compressor 28 can be understood by reference to FIG. 2. Preferably the region-differential video compressor 28 is embodied as a second processor of a second workstation, which executes additional software instructions to perform the steps in FIG. 2. The software instructions are stored in a second memory located in the second workstation.

In step 50, the second processor (the region-differential video compressor 28) determines whether it is time to prepare an update of the display screen 12 of FIG. 1. The frequency of updates could be viewer 10 adjustable or set by a manufacturer. If the viewer 10 selects a frequency, then the selected frequency is sent from the focus coordinates transmitter 24 to the focus coordinates receiver 26, which passes it on to the region-differential video compressor 28. Preferably, the updates are effectively continuous for the focus region, i.e., the high resolution region 18. The updates are effectively continuous in two respects. First, the updates occur sufficiently often, such that there is acceptably little delay between the actual change in a viewer's 10 point of focus and an update of the screen 12 reflecting the change in the focus region. Second, the frequency of updates is sufficiently high, such that at least in the focus region, for the case of the image 32 changing in time, the changes appear continuous to the viewer 10 watching the transmitted image 32 on the screen 12.

If an update is not yet desirable, then the second processor will not proceed to the next step. However, once it is time for an update, then the second processor executes a next step 54 in which it selects a video update window. The video update window is preferably defined as one of the regions on the screen 12 having a certain resolution (high, low, or none) as discussed above. So, in step 54, the second processor selects the video update window that would include the high resolution region 18.

Next, in a step 58, the second processor retrieves, preferably from the second memory, the start coordinates of the update window, the width of the window, and its height (in the case of a rectangular window). This information was stored in the second memory by the focus coordinates receiver 26 in the form of region coordinates, as discussed above.

In step 62, the second processor maps the information retrieved in step 58 onto a pixel map of the screen 12 of the video display device 14. Preferably, the pixel map is stored in the second memory. The pixel map incorporates information about the location of each physical pixel 67 (see FIG. 3) of the screen 12 of the video display device 14. It also incorporates other relevant information, such as the color of the physical pixels and possibly their brightness. In one embodiment, the focus coordinates transmitter 24 supplies the physical pixel 67 location information to the focus coordinates receiver 26 once at the beginning of the point-to-point video transmission.

In the next step 66, the second processor retrieves from the second memory a virtual pixel 68 width and a color precision. The virtual pixel 68 width is the number of physical pixels 67 on the screen 12 on each side of preferably a square area, which defines a virtual pixel 68, as illustrated in FIG. 3.

Figure 3:
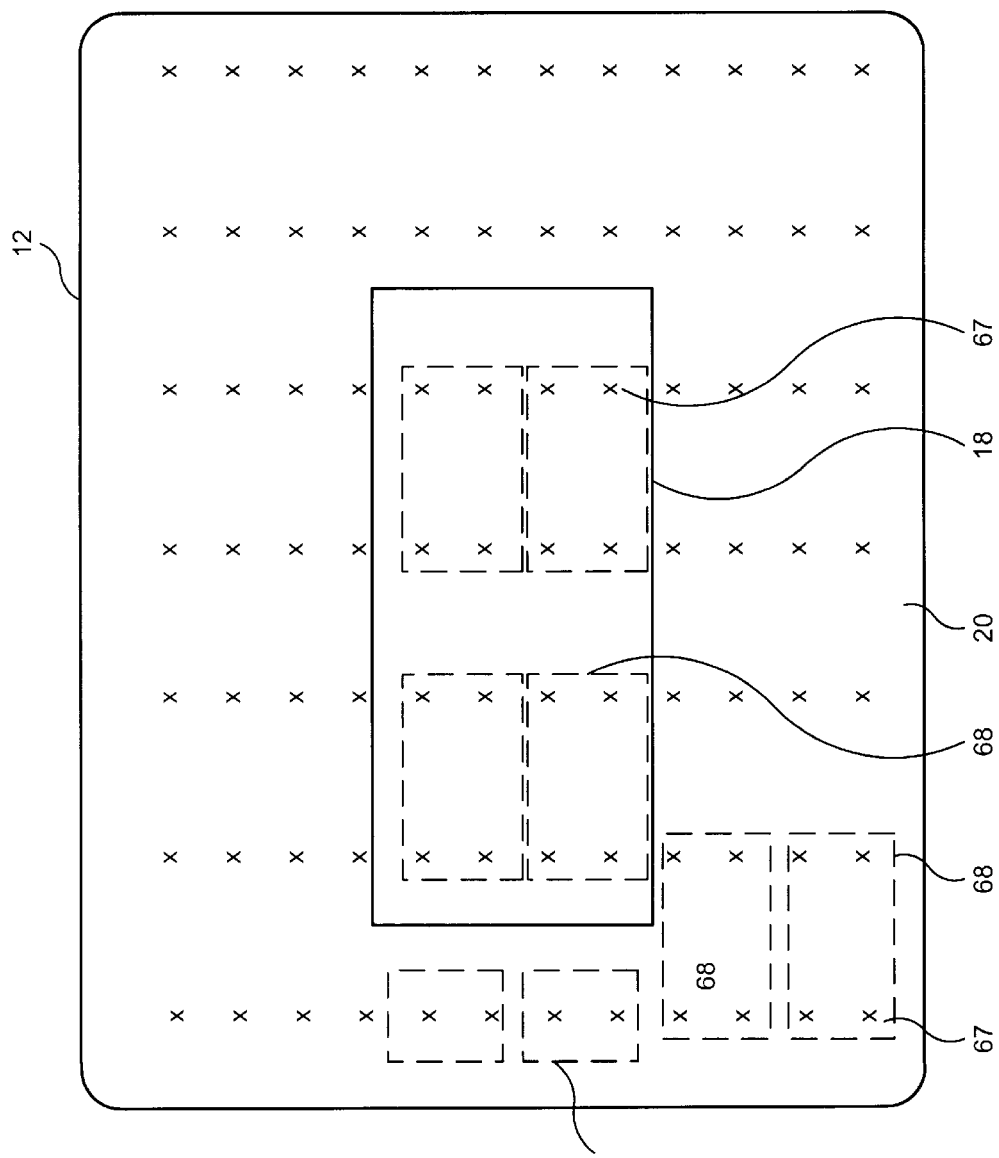
FIG. 3 is a screen comprising display pixels, which are grouped into virtual pixels within high and low resolution regions on a screen of FIG. 1.

FIG. 3 shows the screen 12 comprised of display pixels 67, which are the actual pixels of the screen 12. The display pixels 67 are grouped into virtual pixels 68. A group of virtual pixels 68 comprises the high resolution region 18, which is rectangular in shape in this embodiment. Generally, not only the size, but also the shape of the virtual pixels 68 is variable. For instance, within the low resolution region 20 (which as illustrated in FIG. 3, encompasses the entire screen 12 minus the region covered by the high resolution region 18) some virtual pixels 68 are rectangular in shape. Therefore, a virtual pixel 68 length in addition to the width may have to be stored in the second memory.

The color precision is representative of the number of bits which are used to represent the color of each virtual pixel 68. That number is typically either 8 or 16. Of course, the less color precision is used, the less bandwidth is necessary for transmitting data representative of the virtual pixels 68. The virtual pixel 68 width, as well as the color precision can be stored in the second memory by the manufacturer of the system or be adjustable by the viewer 10 similarly to how the frequency of updates can be viewer 10 adjustables as discussed above.

To illustrate the meaning of color precision, a color precision of 8 means that there are 8 bits used to represent a color. This means that a single pixel can have a color value of one of 256 colors. A color precision of 16 means that a pixel could be one of 65,536 colors.

In step 70, the second processor updates each virtual pixel 68 value in the part of the pixel map encompassed by the window to be updated. The virtual pixel 68 value is the color value for each virtual pixel 68. In the case of the color precision of 8, a virtual pixel 68 value could be one of 256 values. This means that all display pixels 67 of screen 12 that corresponds to the virtual pixel 68 would have that color value. In updating the virtual pixel 68 values within the window to be updated, preferably, the second processor proceeds from the start coordinates from left to right and top to bottom.

In step 74, the second processor packages and sends the data representing the updated window (including the window's width and height, as well as its start coordinates) to the video transmitter 34 shown in FIG. 1. In step 78, the second processor determines whether there is another window to be updated. If there is not, then the second processor returns to step 50, wherein it periodically checks whether it is time for another update of the screen 12.

However, at first, it is likely, depending on the specific implementation of this embodiment, that there will be another window to be updated, since, so far, only the high resolution region 18 has been updated. Therefore, the second processor will return to step 54 to select the video update window representative of the low resolution region 20. Thereafter, the second processor will execute the steps 58–78, as discussed above with respect to the high resolution region 18.

Preferably, the color precision of the high resolution region 18 will be greater than that for the low resolution region 20. Consequently, fewer bits per virtual pixel 68 are necessary to represent the color of each virtual pixel 68 for the low resolution region 20 than for the high resolution region 18. This means that per square unit of area of the screen 12, less data will describe the low resolution region 20 than the high resolution region 18. Thus, the data package for the low resolution region 20 will be smaller than it would be otherwise, were it represented at the same resolution as the high resolution region 18.

In another embodiment, the second processor divides the update window into sub-update windows. Then, the second processor updates packages, and sends to the video transmitter 34 data representative of the first sub-update window. Next, the video transmitter 34 sends the first package to the video receiver 36 for immediately updating the screen 12 with data representative of the first sub-update window without waiting for the entire update window to be packaged. The second processor repeats the above steps for all sub-update windows until the entire window is updated and sent to the video transmitter 34.

In other embodiments of the invention, the frequency of updates for the low resolution region 20 also is less than that for the high resolution region 18. Therefore, on average, even more data can be used to represent the high resolution region 18, since less data will have to be transmitted for the low resolution region 20 per unit of time. Moreover, preferably, unchanging regions of the image 32 are transmitted only once. In general, other means of video compression are also complementary to the strategy described by this embodiment.

Returning to FIG. 1, the region-differential video compressor 28 sends the data packages for updating the various resolution regions on screen 12 via a video transmitter 34 to a video receiver 36. (As discussed above, preferably, the video transmitter 34 transmits the information for the update windows in digitized form.) Generally, it is preferable to prioritize the process or system such that data representative of higher resolution regions is transmitted at least as frequently as data for lower resolution regions. Furthermore, if necessary, transmissions of data representative of a high resolution region should override that of lower resolution regions. Overriding the transmission of a lower resolution region may be necessary, when there is barely sufficient time before another update is required to transmit the data for the high resolution region. The problem of limited transmission time may be particularly acute, when the source image 32 is fast-changing.

Preferably the video transmitter 34 and receiver 36 cooperate to send and receive the data packages via standard, commercially-available asynchronous transfer mode (ATM) transmission. ATM transmission makes possible the simultaneous sending of multiple types of data at high transfer rates through a switching network. For instance, data packages for region coordinates, sound data (for example, sound accompanying the video image), and video window updates can be sent substantially simultaneously.

Figure 4:
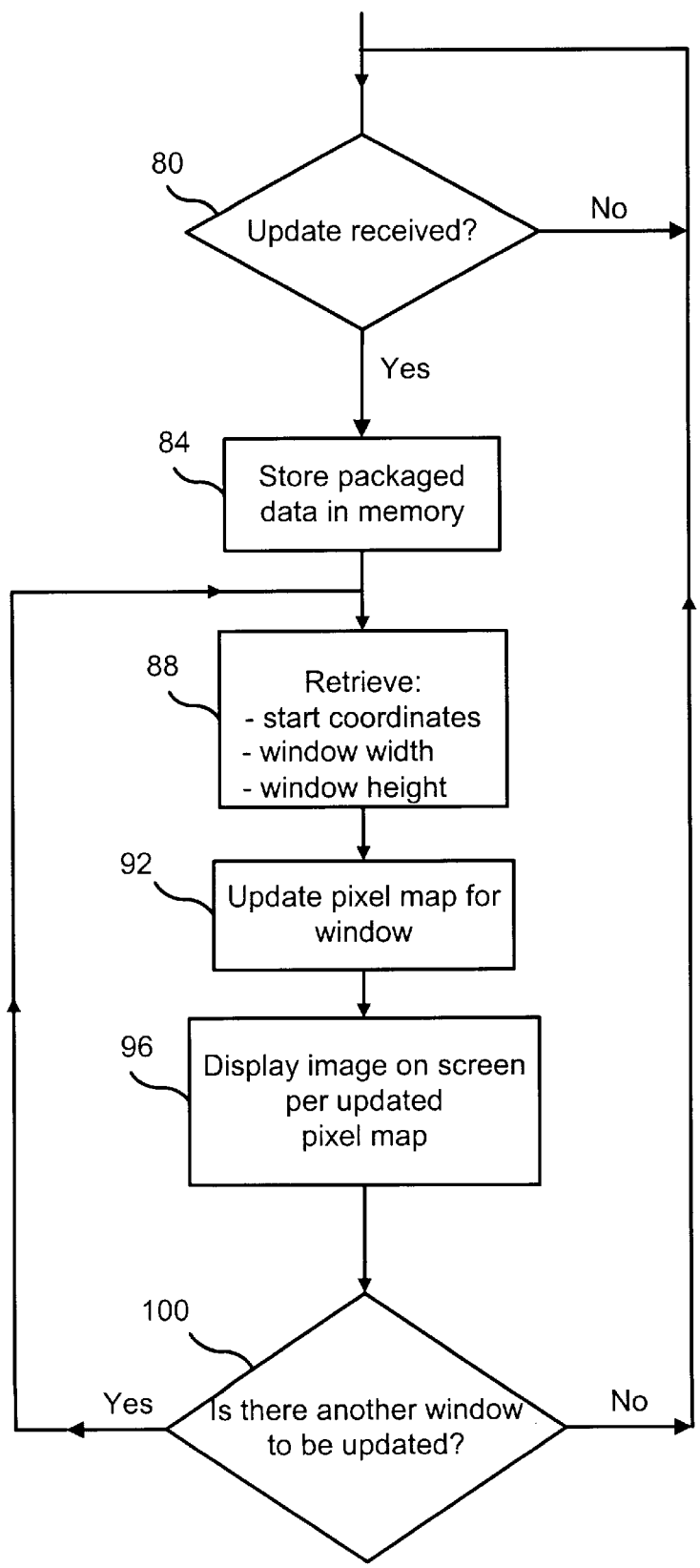
FIG. 4 is a flow chart of the steps performed by a processor implementing the functions of a region-differential video decompressor and image assembler of FIG. 1.

The video receiver 36 passes on the data packages it receives to the region-differential video decompressor and image assembler 38, which is preferably embodied in the first processor in the first workstation executing software instructions stored in the first memory to perform steps shown in FIG. 4.

Basically, the steps shown in FIG. 4 are the reverse of those illustrated in FIG. 2. In step 80, the first processor determines whether an update for the screen 12 has been received. Until an update has been received, the first processor continues to check for a newly received update. (While the first processor is waiting for an update, the first processor can perform other tasks.) Once the first processor determines that an update has been received, then the first processor executes step 84.

In step 84, the first processor stores in the first memory the received data, which was packaged in accordance with the process of FIG. 2. Next, the first processor executes step 88 in which it retrieves from start coordinates of the first window to be updated, the window's width, and the window's height. (As discussed in the context of FIG. 2, the packaged data includes the window's width, height, and start coordinates.)

In step 92, the first processor updates a pixel map of the screen 12 for the window that it is currently updating. The first processor stores the updated pixel map in the first memory. Similar to the pixel map discussed above with respect to the second processor, here, too, the pixel map is a map in which each entry corresponds to a pixel in the screen 12. But only once it has been updated, does the pixel map in the first memory become a copy of the one in the second memory, at least until the one in the second memory is updated again, in accordance with FIG. 2. In step 92, the updating of the pixel map in the first memory basically comprises updating the virtual pixel 68 value for each physical pixel 67 in accordance with the update data received in step 80. Thereafter, in step 96, the first processor displays an updated image on the screen 12 in accordance with the updated pixel map. Since, preferably, the high resolution region 18 is updated first, the updated screen initially would only change with respect to the high resolution region 18, but not with respect to any other regions.

Next, in step 100, the first processor searches the stored package data to determine whether there is another window to be updated. Often it will be desirable to update not only the high resolution region 18, but also the low resolution region 20. Therefore, the answer to the question in step 100 will typically be yes. Thus, following step 100, the first processor will re-execute the steps in FIG. 4 beginning with step 88. In fact, the first processor will re-execute the steps in FIG. 4 beginning with step 88 for any further windows that are updated, since there may be more than two. As already mentioned, the screen 12 can be subdivided into a high number of different regions with different resolutions.

Once all windows are updated, according to step 100, the first processor will return to step 80, i.e., the first processor will basically idle or perform other tasks until another update is received. This completes the discussion of the process and system illustrated in FIG.'s 1, 2, 3, and 4.

In another embodiment, the step of determining the high resolution region 18 still is controlled by viewer 10, but only indirectly so. For example, eye tracking technology, specifically of the pupil tracking variety, is used to determine the region on the screen 12 on which the viewer 10 is focusing. The ability to track pupil movement was originally developed for military applications such as weapon targeting by fighter jet pilots. This technology has been applied to an eye control focus camera sold by Canon Inc. under the model number EOS A2E. This camera uses the pupil tracking technology to determine where in its field of view the auto-focus mechanism should focus the camera. In this embodiment, the focus region is determined by tracking at least one of the pupils of viewer 10.

In addition, instead of determining the actual field of vision of viewer 10 by inferring it from the focus region, in another embodiment, the actual field of vision can be estimated by use of helmets used in virtual reality systems for determining a person's head orientation. The actual field of vision can be estimated by simply using the dimensions of an average person's actual field of vision and superimposing those on the head orientation of viewer 10.

In another embodiment, the video source 29 of FIG. 1 includes a first microphone 102 for detecting and recording any sound that might accompany the image 32. The video source 29 preferably comprises a video camera having at least one microphone, which is often a standard feature. The sound is transmitted to the video display device 14 preferably, as discussed above, by use of asynchronous transfer mode hardware and software. The video display device 14 has a speaker 104 for reproducing the sound recorded by the video source 29.

In another embodiment, the video transmitter 34 in FIG. 1, transmits the packaged region-differentially compressed image 32 to multiple video receivers 36. In this embodiment, basically, the compressed image 32 is received by multiple right halves of FIG. 1. As shown in FIG. 1, each video receiver 36 supplies a video display device 14 for updating the individual resolution regions on attached screens 12 for a viewer 10. Preferably, each video display device 14 contains a processor that executes the steps in FIG. 4 for decompressing and assembling the image per element 38 in FIG. 1.

In another embodiment, in addition to the multiple video receivers 36, there are multiple remote transmitting locations. Each location has a source image 32, a video source 29, a focus coordinates receiver 26, a region-differential video compressor 28, and a video transmitter 34. All of the video transmitters 34 and video receivers 36 are networked to permit the sending and receiving of region-differentially compressed images from each video transmitter 34 to each video receiver 36.

In another embodiment, FIG. 1 includes a capability for remote virtual reality. The orientation of the viewer's 10 head is transmitted to the video source 29 for orienting the video source 29 in accordance with the viewer's 10 head orientation. This embodiment would yield a sense of "being there."

In another embodiment, the described embodiment of FIG. 1 is extended to a multiple viewer 10 system. In such a system, there is more than one viewer 10 watching a single screen 12. The high and low resolution regions 18 and 20 would be determined as illustrated in FIG. 1 for each viewer 10. The region coordinates for each viewer 10 are transmitted as in FIG. 1 to the region-differential video compressor 28. But the video data transmitted by the video transmitter 34 would only have to be augmented over that of a single viewer 10 system by data for non-overlapping resolution regions.

For example, if each viewer 10 were to focus on the same high resolution region 18, then no additional data for the high resolution region 18 would have to be transmitted by the video transmitter 34 to accommodate the additional viewers 10. However, if each viewer 10 focuses on a different region on the screen 12, such that no high resolution regions 18 overlap, then the region-differential video compressor 28 will have to process data for more than one high resolution region 18.

A multiple viewer 10 system can be converted into a multiple remote virtual reality system. In that system, each viewer 10 is preferably equipped with a virtual reality headset and is watching an individual screen 12. However, each screen 12 preferably samples only a portion of the video which corresponds to the actual field of vision of the individual viewer 10.

Further, any of the systems described for video can be used for the compression and decompression of sound images in addition to or in place of the video compression. In one embodiment, basically, only sound within the viewer's 10 immediate earshot is transmitted with a high degree of resolution. In another embodiment, the viewer 10 selectively chooses which sound he or she would like to hear with a high degree of resolution. For instance, the viewer 10 could select to listen at a high resolution only frequencies above or below a certain frequency or within a certain frequency range. So, for the case of a selected frequency range, the region-differential compressor 28 compresses the sound data from a sound image 32, such that more data per frequency is transmitted for sound within the selected frequency range and less outside. As with respect to a video image, there could be more than two regions of sound resolution.

Moreover, instead of or in addition to frequency regions, there can be spatial regions of sound. To illustrate, the viewer 10 could select to hear sound from a certain direction to be clearer than sound from another direction. Such sound directional listening can be achieved with a sonar array as part of a sensory source 29 for recording and digitizing sound from a sensory source image 32. Another sonar array can supplement the screen 12 for directional listening. Analogously, other sensory perceptions can be differentially compressed as well. The viewer 10 would select categories of sensory perception that would be transmitted and received at higher resolution than other categories.

Several preferred embodiments of the present invention have been described. Nevertheless, it will be understood that various modifications may be made without departing from the spirit and scope of the invention. For example, the process of compressing sensory images can be applied to pay-per-play video games. A video game can be located remotely, yet accessed via a communications network by a viewer 10. As above, to provide a fast update capability of the game as it is being displayed on the screen 12, only the focus region of viewer 10 is displayed on the screen 12 as a high resolution region 18. Thus, the present invention is not limited to the preferred embodiments described herein, but may be altered in a variety of ways, which will be apparent to persons skilled in the art.

What is claimed is:

1. A process for selectively manipulating the display resolution of a sensory image displayed with a sensory image display device having display elements, the process comprising the steps of:
   a. selecting, in accordance with a viewer's control, a subset of the display elements of the sensory image,
   b. transmitting to the sensory image display device a first level of detail for the selected subset of display elements, and
   c. transmitting to the sensory image display device a second level of detail for the remainder of the display elements which were not selected;
   wherein steps b and c are performed at the same time.

2. A process as recited in claim 1,
   a. wherein the sensory image display device comprises a screen; and
   b. wherein the display elements are pixels of the screen.

3. A process for selectively manipulating the display resolution of a sensory image transmitted to a display device at a given transmission bandwidth, the process comprising the steps of:
   a. determining, in accordance with a viewer's control, coordinates of a focus region on the display device on which the viewer is focusing and coordinates of a non-focus region on the display device on which the user is not focusing; but which is within the viewer's field of vision;
   b. receiving a digitized sensory image;

c. region-differentially processing the digitized sensory image in accordance with the viewer determined coordinates of the focus and non-focus regions such that at the given transmission bandwidth, image data transmitted to the focus region is at a different resolution than that transmitted to the non-focus region; and
   d. displaying the sensory image on the display device;
   wherein the image data is transmitted to both the focus region and the non-focus regions at the same time.

4. A process as recited in claim 3 wherein the step of region-differentially processing comprises the steps of:
   a. region-differentially compressing the digitized image in accordance with the coordinates of the focus and non-focus regions so as to allow more image data to be transmitted to the focus region than to the non-focus region at the given transmission bandwidth;
   b. transmitting the region-differentially compressed image to the display device;
   c. region-differentially decompressing the compressed image; and
   d. assembling the decompressed image.

5. A process as recited in claim 4, further comprising the steps of:
   recording the sensory image; and
   digitizing the sensory image.

6. A system for manipulating display resolution of a sensory image transmitted at a given transmission bandwidth, the system comprising:
   a. a sensory display device having a screen;
   b. means, in accordance with a viewer's control, for determining region coordinates of a focus region on the screen on which the viewer is focusing and a non-focus region on the screen on which the viewer is not focusing, but is within the viewer's field of vision;
   c. means for receiving digitized sensory image; and
   d means for region-differentially processing the digitized sensory source image in accordance with the region coordinates such that at the given transmission bandwidth, the display resolution of the sensory image at the focus region is different than that at the non-focus region;
   wherein the image data is transmitted to both the focus region and the non-focus region at the same-time.

7. A system as recited in claim 6, further comprising
   a sensory image recorder including a video camera for recording a video image; and
   an image digitizer, responsive to the image recorder, for digitizing the video image;
   wherein the sensory display device includes a video display device.

8. A system as recited in claim 6,
   a. wherein the sensory display device comprises a speaker for providing sound in accompaniment of an image displayed on the screen of the video display device;
   b. wherein the sensory image recorder comprises a microphone for recording sound accompanying the video image; and
   c. further comprising means for coupling sound from the speaker to the microphone.

9. A system as recited in claim 6, wherein the means for region-differentially processing comprises:
   a. means for region-differentially compressing the digitized sensory image in accordance with the region coordinates of the focus and non-focus regions so as to allow more image data to be transmitted to the focus region than to the non-focus region at the given transmission bandwidth;

b. means for transmitting the region-differentially compressed sensory image to the display device;

c. means for region-differentially decompressing the compressed sensory image; and d. means for assembling the decompressed image for displaying on the display device.

10. A system for manipulating display resolution of a video image transmitted at a given transmission bandwidth, the system comprising:

a. a monitor having a screen and an input;

b. a viewer controllable pointing device having an output representative of location information of a focus region on the screen on which the viewer is focusing and a non-focus region on the screen on which the viewer is not focusing, but is within the viewer's field of vision;

c. a first memory;

d. a first processor coupled to the first memory, having an output and having an input coupled to the output of the pointing device and for receiving a region-differentially compressed source image, the first processor being capable of executing instructions stored in the first memory for converting the location information of the focus and non-focus regions into region coordinates, for making available for transmission at its output the region coordinates, for region-differentially decompressing and assembling the compressed image, and for making available at its output the assembled image for coupling to the input of the monitor for display on the screen;

e. video camera, having an output, for recording a source image and making it available at the output;

f. an image digitizer, coupled to the video camera, for digitizing the source image and having an output representative of the digitized source image;

g. a second memory; and h. a second processor, coupled to the second memory and having an output and an input coupled to the output of the image digitizer, the second processor being capable of executing instructions stored in the second memory for receiving the region coordinates at its input, for region-differentially compressing the digitized source image in accordance with the region coordinates, and for making available at its output for transmission the region-differentially compressed source image to the input of the first processor, wherein image data of the compressed source image is transmitted to the focus region and the non-focus region on the screen at the given transmission bandwidth at the same time.

11. A process for manipulating display resolution of an image transmitted to a display device at a given transmission bandwidth, the process comprising the steps of:

defining, in accordance with a viewer's control, a focus region at a first location on the display device on which the viewer is focusing;

defining, in accordance with the viewer's control, a non-focus region at a second location on the display device on which the viewer is not focusing, but is within the viewer's field of vision;

transmitting image data to the focus region of the display device for displaying at a first resolution; and transmitting image data to the non-focus region of the display device for displaying at a second resolution;

wherein the image data is transmitted to the focus region and the non-focus region of the display device at the given transmission bandwidth at the same time.

12. The process of claim 11, further comprising the steps of:

changing, in accordance with the viewer's control, the location of the focus region to a third location on the display device;

changing, in accordance with the viewer's control, the location of the non-focus region to a fourth location on the display device;

transmitting image data to the focus region at the third location of the focus region on the display device for displaying at a third resolution;

transmitting image data to the non-focus region at the fourth location of the non-focus region on the display device;

wherein the image data is transmitted to the focus region at the third location and the non-focus region at the fourth location at the given transmission bandwidth at substantially the same time;

wherein the image data transmitted to the focus region at the third location is more than that transmitted to the non-focus region at the fourth location;

wherein the third resolution is higher than the fourth resolution.

13. The process of claim 11, wherein the display device includes a screen;

wherein the viewer's field of vision comprises the entire screen, wherein the non-focus region is the entire screen other than the focus region.

* * * * *